(12) United States Patent
Sharpe et al.

(10) Patent No.: US 12,705,423 B2
(45) Date of Patent: Aug. 11, 2026

(54) SYSTEMS AND METHODS FOR LINK RESOLUTION FOR INTERNAL ENTITIES AND DOCUMENTATION USING PRE-SEEDED LANGUAGE MODELS

(71) Applicant: Capital One Services, LLC, McLean, VA (US)

(72) Inventors: Samuel Sharpe, Somerville, MA (US); Taylor Turner, Richmond, VA (US); Kenny Bean, Herndon, VA (US)

(73) Assignee: Capital One Services, LLC, McLean, VA (US)

( * ) Notice: Subject to any disclaimer, the term of this patent is extended or adjusted under 35 U.S.C. 154(b) by 149 days.

(21) Appl. No.: 18/887,004

(22) Filed: Sep. 16, 2024

(65) Prior Publication Data

US 2026/0080165 A1 Mar. 19, 2026

(51) Int. Cl.

*G06F 40/211* (2020.01)
*G06F 16/2457* (2019.01)
*G06F 40/169* (2020.01)

(52) U.S. Cl.

CPC ...... *G06F 40/211* (2020.01); *G06F 16/24578* (2019.01); *G06F 40/169* (2020.01)

(58) Field of Classification Search

USPC ........................................................ 704/1–504
See application file for complete search history.

(56) References Cited

U.S. PATENT DOCUMENTS 9,966,065 B2 * 5/2018 Gruber ..................... G10L 15/28
10,691,473 B2 * 6/2020 Karashchuk ............ G06F 9/453
10,755,051 B2 * 8/2020 Piernot .................. G06F 40/30
11,526,368 B2 * 12/2022 Karashchuk ............ G06F 9/453
11,748,555 B2 * 9/2023 Tran ....................... G06N 20/00 715/202
12,299,385 B2 * 5/2025 Tran ..................... G06N 3/0455
12,456,017 B2 * 10/2025 Burton .................... G06F 40/30
2011/0106807 A1 * 5/2011 Srihari .................. G06F 16/288 707/E17.046
2022/0237368 A1 * 7/2022 Tran ........................ G06F 21/32
2023/0351102 A1 * 11/2023 Tran ..................... G06N 3/0895
2026/0080165 A1 * 3/2026 Sharpe .................. G06F 40/211

* cited by examiner

*Primary Examiner* — Marcus T Riley
(74) *Attorney, Agent, or Firm* — Foley & Lardner LLP

(57) ABSTRACT

Systems and methods for an artificial intelligence model architecture that involves a first artificial intelligence model trained to map a plurality of entities to ranked documentation from a documentation source, and a second artificial intelligence model that comprises a language model trained to generate an additional query to run on the plurality of documents from the documentation source. By training the second model to generate additional queries as entities and/or links are discovered, the system may quickly and efficiently determine links and/or potential resolutions as well as received feedback thereon.

20 Claims, 4 Drawing Sheets

100

300
306
302
310
350
304
332
322
328
330
324

SYSTEMS AND METHODS FOR LINK RESOLUTION FOR INTERNAL ENTITIES AND DOCUMENTATION USING PRE-SEEDED LANGUAGE MODELS

BACKGROUND

Computer networks for organizations are technically complicated due to a variety of factors that stem from the need to support diverse operational requirements, ensure security, maintain reliability, and adapt to technological advancements. Firstly, the scale and complexity of organizational networks often involve multiple interconnected devices across various locations, each with specific configuration needs. This includes servers, workstations, mobile devices, and increasingly, Internet of Things (IoT) devices, all of which require careful integration into the network. Secondly, security poses a significant challenge as networks must protect sensitive organizational data against a wide array of threats. Implementing robust security measures such as firewalls, encryption, intrusion detection systems, and regularly updated protocols adds layers of complexity to network design and management. Additionally, reliability and uptime are crucial for business operations. Organizations depend on their networks for critical services, requiring highly available and fault-tolerant systems. This involves redundant hardware, failover mechanisms, and meticulous disaster recovery planning to ensure services remain online even during failures or maintenance periods. Lastly, technological advancements and evolving business needs demand that networks remain flexible and scalable. Integrating new technologies, accommodating increasing amounts of data, and expanding network capacity as the organization grows require ongoing adjustments and upgrades. This dynamic environment necessitates a forward-thinking approach to network architecture and ongoing technical expertise to manage complexities effectively. These factors combine to make organizational computer networks inherently complex, requiring specialized knowledge and constant vigilance to operate efficiently and securely.

Underlying the technical complication of these computer networks is the various interlocking and/or overlapping nest of network entities such as models, programs, sub-organizations, and/or initiatives that are documented somewhere across the different internal applications within the computer networks. Given the vastness of these internal applications as well as the number of different internal applications important information (such as internal cross-references) is often not linked in documents that reference these entities.

SUMMARY

Systems and methods are described herein for novel uses and/or improvements to artificial intelligence applications. As one example, methods and systems are described herein for link resolution using artificial intelligence models. For example, artificial intelligence, including, but not limited to, machine learning, deep learning, etc. (referred to collectively herein as artificial intelligence models, machine learning models, or simply models) has exponentially increased. Key benefits of artificial intelligence are its ability to process data, find underlying patterns, and/or perform real-time determinations. Such benefits seem well suited for link resolution; however, application of artificial intelligence models to link resolution faces several technical problems.

For example, when an artificial intelligence model attempts to perform link resolution between entities and the documents that reference these entities, it faces several technical challenges. One of the primary difficulties is the ambiguity and variability in how entities are referenced or named within different documents. Entities can be mentioned in various forms—such as abbreviations, aliases, or even through indirect references—which makes the task of accurately identifying and linking them to the correct entity highly complex. Another significant challenge is the sheer volume and diversity of data that the model must process. Documents may come from multiple sources and formats, each with its own style, context, and level of detail, complicating the process of standardizing and extracting relevant information for entity resolution.

Furthermore, the model must deal with incomplete or erroneous data, which can lead to incorrect links or missed connections between documents and entities. Ensuring the accuracy of these links often requires sophisticated natural language processing (NLP) techniques and contextual understanding, which are not only resource-intensive but also need constant refinement to adapt to new types and sources of data. Additionally, maintaining consistency and updating the entity resolution as new information becomes available poses a logistical challenge. The model needs to be dynamic, capable of learning from new data, and correcting previous errors automatically, which involves complex algorithms and ongoing learning processes. Lastly, performance and scalability are also critical issues, as the model must process potentially large volumes of documents efficiently without sacrificing the accuracy or speed of the link resolution process. Balancing these factors requires a well-optimized system architecture and powerful computational resources.

To overcome these technical deficiencies in adapting artificial intelligence models for this practical benefit, systems and methods disclosed herein recite the use of pre-seeded training data and feedback on that training data. For example, pre-seeded training data provides a solid foundation of high-quality, relevant examples of links that a model can learn from. This is particularly important in the initial stages of training when the model needs a substantial amount of structured and well-labeled entities, documents, and the links between to start developing its predictive capabilities. With the set of pre-seeded data, models can reach a functional level of performance more quickly. This data acts as a catalyst, accelerating the learning process by giving the model a head start with examples that exemplify the kind of patterns and relationships it needs to recognize in the data as well as reducing the risk of overfitting on a narrow or non-representative set of training examples.

To generate this pre-seeded training data, the system uses a novel artificial intelligence model architecture that involves a first artificial intelligence model trained to map a plurality of entities to ranked documentation from a documentation source, whereas the second artificial intelligence model comprises a language model trained to generate an additional query to run on the plurality of documents from the documentation source. By training the second model to generate additional queries as entities and/or links are discovered, the system may quickly and efficiently determine links and/or potential resolutions as well as received feedback thereon.

In some aspects, systems and methods for link resolution for internal entities and documentation using pre-seeded language models are described. For example, the system may receive, at a user interface, a first user input, wherein the first user input comprises entry of a first text string into a document writing software application. The system may parse the first text string. The system may identify a first entity identifier of a plurality of entity identifiers in the first text string, wherein the first entity identifier corresponds to a first entity of a plurality of entities registered for the document writing software application. The system may, in response to identifying the first entity identifier, generate a first feature input for a first artificial intelligence model, wherein the first artificial intelligence model is trained to generate a ranked mapping of the plurality of entities to a plurality of documents using a second artificial intelligence model that is trained to generate additional queries to run on the plurality of documents to determine rankings for the plurality of documents. The system may input the first feature input into the first artificial intelligence model to receive a first output, wherein the first output comprises a first document identifier for a first document from the plurality of documents corresponding to the first entity identifier that is determined to have a first rank based on one or more ranking criteria. The system may generate for display, in the user interface, the first text string with a first annotation comprising the first document identifier for the first document and the first rank.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
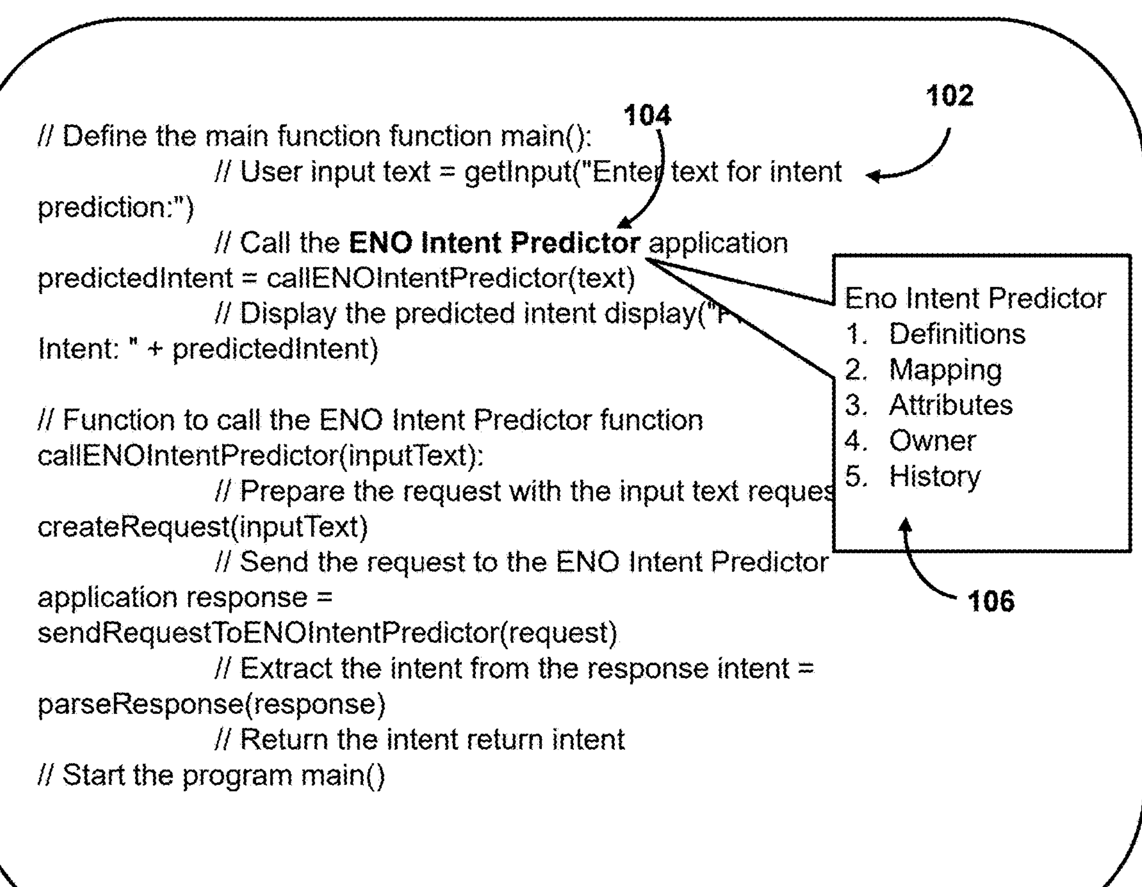
FIG. 1 shows an illustrative diagram for generating pre-seeded training data using a document writing software application, in accordance with one or more embodiments.
Figure 1:
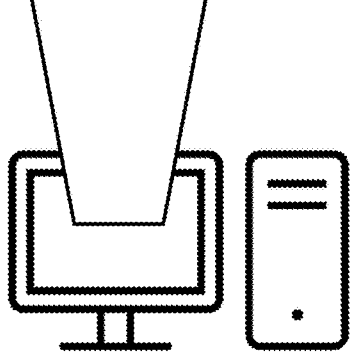

FIG. 1 shows an illustrative diagram for generating pre-seeded training data using a document writing software application, in accordance with one or more embodiments. For example, user interface 100 may indicate a component used for link resolution for internal entities and documentation using pre-seeded language models. To overcome these technical deficiencies in adapting artificial intelligence models for this practical benefit, systems and methods disclosed herein recite the use of pre-seeded training data and feedback on that training data. For example, pre-seeded training data for artificial intelligence models refers to a foundational dataset used to start the training process of a machine learning model. This dataset is typically well-curated, richly annotated, and highly relevant to the specific tasks the model is being developed to perform. The generation of pre-seeded training data can vary widely based on the application but often involves collecting real-world data that is then cleaned, labeled, and organized by human annotators or through automated processes. In some cases, synthetic data generation techniques, such as simulations or data augmentation methods, are also used to enhance the dataset without the need for collecting more real-world data.

The benefits of using pre-seeded training data are manifold. Firstly, it provides a reliable and relevant starting point for model training, which is particularly crucial for ensuring that the model learns the correct patterns and behaviors from the very beginning. A robust starting dataset reduces the learning curve and helps prevent common issues such as model bias or overfitting, particularly in scenarios where data might be scarce or imbalanced. Furthermore, pre-seeded data helps establish a benchmark against which the model's initial performance can be measured, offering insights into its strengths and weaknesses early in the development cycle. This early evaluation allows developers to make necessary adjustments or enhancements to the model before it is further trained or deployed. Thus, pre-seeded training data not only accelerates the training process but also enhances the overall quality and efficacy of the artificial intelligence model.

To generate this pre-seeded training data, the system uses a novel artificial intelligence model architecture that involves a first artificial intelligence model trained to map a plurality of entities to ranked documentation from a documentation source, whereas the second artificial intelligence model comprises a language model trained to generate an additional query to run on the plurality of documents from the documentation source. By training the second model to generate additional queries as entities and/or links are discovered, the system may quickly and efficiently determine links and/or potential resolutions as well as received feedback thereon.

The system may acquire the training data as developers use a document writing software application. A document writing software application is a program designed to help users create, edit, format, and manage text-based documents. These applications provide a suite of tools that facilitate the writing process, making it easier to produce well-structured and visually appealing documents. Common features include text editing capabilities such as spell check, grammar correction, style formatting, and the ability to insert images, tables, and hyperlinks. Advanced versions may also offer features like document collaboration, where multiple users can edit and comment on a document simultaneously, as well as version control, which keeps a history of changes made to the document.

Such software varies widely, from basic word processors to complex desktop publishing systems. Popular examples include Microsoft Word, Google Docs, and Adobe InDesign, each catering to different needs. For instance, Microsoft Word is known for its comprehensive features suitable for everything from simple letter writing to complex report creation, while Google Docs excels in online collaboration, and Adobe InDesign is tailored for sophisticated layout and design tasks often needed in publishing. These applications are essential tools in both personal and professional contexts, enabling efficient document creation and management in our increasingly digital world.

User interface 100 shows content related to a document writing software application. As referred to herein, a "user interface" may comprise a human-computer interaction and communication in a device, and may include display screens, keyboards, a mouse, and the appearance of a desktop. For example, a user interface may comprise a way a user interacts with an application or a website.

As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user generated content may include content created and/or consumed by a user. For example, user generated content may include content created by another, but consumed and/or published by the user.

The system may monitor content generated by the user to generate user profile data. As referred to herein, "a user profile" and/or "user profile data" may comprise data actively and/or passively collected about a user. For example, the user profile data may comprise content generated by the user and a user characteristic for the user. A user profile may be content consumed and/or created by a user. User profile data may also include a user characteristic. As referred to herein, "a user characteristic" may include about a user and/or information included in a directory of stored user settings, preferences, and information for the user. For example, a user profile may have the settings for the user's installed programs and operating system. In some embodiments, the user profile may be a visual display of personal data associated with a specific user, or a customized desktop environment. In some embodiments, the user profile may be digital representation of a person's identity. The data in the user profile may be generated based on the system actively or passively monitoring.

User interface 100 includes script 102. For example, in a document writing software application, code that is written to create, manipulate, or style documents is typically referred to as "macros" or "scripting." These macros or scripts can automate repetitive tasks, configure custom formatting, or even handle complex data processing within the document. This allows users to enhance their productivity and extend the functionality of the application beyond standard text editing features. The specific language and capabilities of the macros or scripts can vary depending on the software application, with some using proprietary scripting languages and others supporting more standard programming languages like JavaScript or Python.

As shown in user interface 100, the system may receive, at user interface 100, a first user input, wherein the first user input comprises entry of a first text string into a document writing software application (e.g., script 102). The system may then parse the first text string based on a type of the document writing software application. When a system parses text strings in code or script based on the type of document writing software application, it typically employs a specialized parser that is configured to understand the syntax and structure specific to that software's scripting or programming language. Document writing applications often have their own unique scripting languages or support standard programming languages with specific APIs or libraries that interact with the document's contents. For example, Microsoft Word uses Visual Basic for Applications (VBA) as its scripting language, allowing scripts to manipulate text, formatting, and other document elements programmatically. A system designed to parse VBA scripts must be able to recognize VBA syntax and semantics, extracting and interpreting commands that manipulate the Word document. Similarly, in applications like Adobe InDesign, which use JavaScript for scripting, the system's parser needs to understand JavaScript syntax and the specific InDesign DOM (Document Object Model) to effectively parse scripts that interact with page elements and layouts.

In some embodiments, the parsing process involves breaking down the text strings into recognizable tokens, identifying their functions (like commands, functions, variables), and understanding their contextual relationships within the script. This allows the system to execute or modify these scripts accurately according to the user's commands or to automate tasks within the document based on the script's logic. Such parsing is essential for enabling advanced features like macro automation, batch editing, or custom functionality extensions, which can significantly enhance productivity and allow for highly customized document processing workflows in the respective document writing software.

As shown in user interface 100, the system has identified a first entity identifier of a plurality of entity identifiers, wherein the first entity identifier corresponds to a first entity of a plurality of entities registered for the document writing software application. As described herein, "entities" may refer to components such as objects, functions, or other resources registered within the document writing application, which in turn may correspond to models, programs, sub-organizations, and/or initiatives that are documented somewhere across the different internal applications within the computer networks. These entities could include predefined templates, custom functions, user interfaces, or plugins that interact with the application. To identify, the system may start by parsing the code or script associated with the document writing software. This parsing process breaks down the script into its basic structural elements, such as variables, function calls, and object references. Each element is analyzed to match identifiers to known entities within the application's ecosystem. This matching process relies on a lookup in a registry or database that lists all entities and their corresponding identifiers used by the application. For example, if the script references a function to insert a table, the system will parse this function call and compare the identifier used in the script with a list of identifiers known to correspond to functions or methods for creating tables in the document software. This could be straightforward if the identifier is unique and well-documented, such as a method name like insertTable( ) or an object like Document.Tables.Add( ). Once the system identifies a match, it confirms that the parsed identifier corresponds to the correct entity within the software. It then processes the script further based on this identification, which could involve executing the function, modifying it, or tracking its usage for debugging or enhancement purposes.

As shown in FIG. 1, the system has matched an entity identifier to an entity and generates an annotation (e.g., annotation 106) in response. Annotations can include comments, notes, corrections, or other types of contextual information intended to provide additional insight into the text without altering the primary content. The process of generating and displaying annotations involves several user interface components and functionalities that enhance the interactivity and utility of the document. In some embodiments, annotations may be generated through a specific tool or menu option within the application. Users can select a portion of text and then choose to add an annotation via right-click context menus, dedicated toolbar icons, or keyboard shortcuts. This action usually opens a sidebar, popup, or an inline space where the user can type their annotation. The placement and display of annotations can vary based on the application and user settings. In one example, the annotations may be displayed alongside the text, usually in the margins of the document. These are often connected to the relevant text by a line or an indicator, making it clear which part of the text they refer to. In another example, the annotations may be shown directly within the text flow, often highlighted by a change in text color or a surrounding border. Inline annotations may be collapsible or expandable to avoid disrupting the readability of the main text. In another example, the annotation may be in a popup window that appears when the user hovers over or clicks on a particular text segment. This method keeps the document's appearance clean while still providing immediate access to annotations. In another example, the annotations can also be linked to traditional footnotes or endnotes at the bottom of the page or at the end of the document, respectively.

Annotations can be formatted with different text styles, colors, and emphasis to distinguish them from the main content. Users might also have options to tag annotations with specific categories or labels, assign them to particular team members, or mark them with priority levels, enhancing the collaborative and organizational capabilities of the document. Furthermore, the user interface may allow for the dynamic interaction with annotations. For example, users can typically edit, delete, reply to, or even move annotations within the document. Collaborative features may include tracking who made which annotation and when, or allowing multiple users to add to a thread of comments on the same text passage.

To generate the annotations, the system may perform a link resolution between entities and the documents that reference these entities. Based on the link resolution, the system may generate content in annotation 106 as described in FIG. 2.

Figure 2:
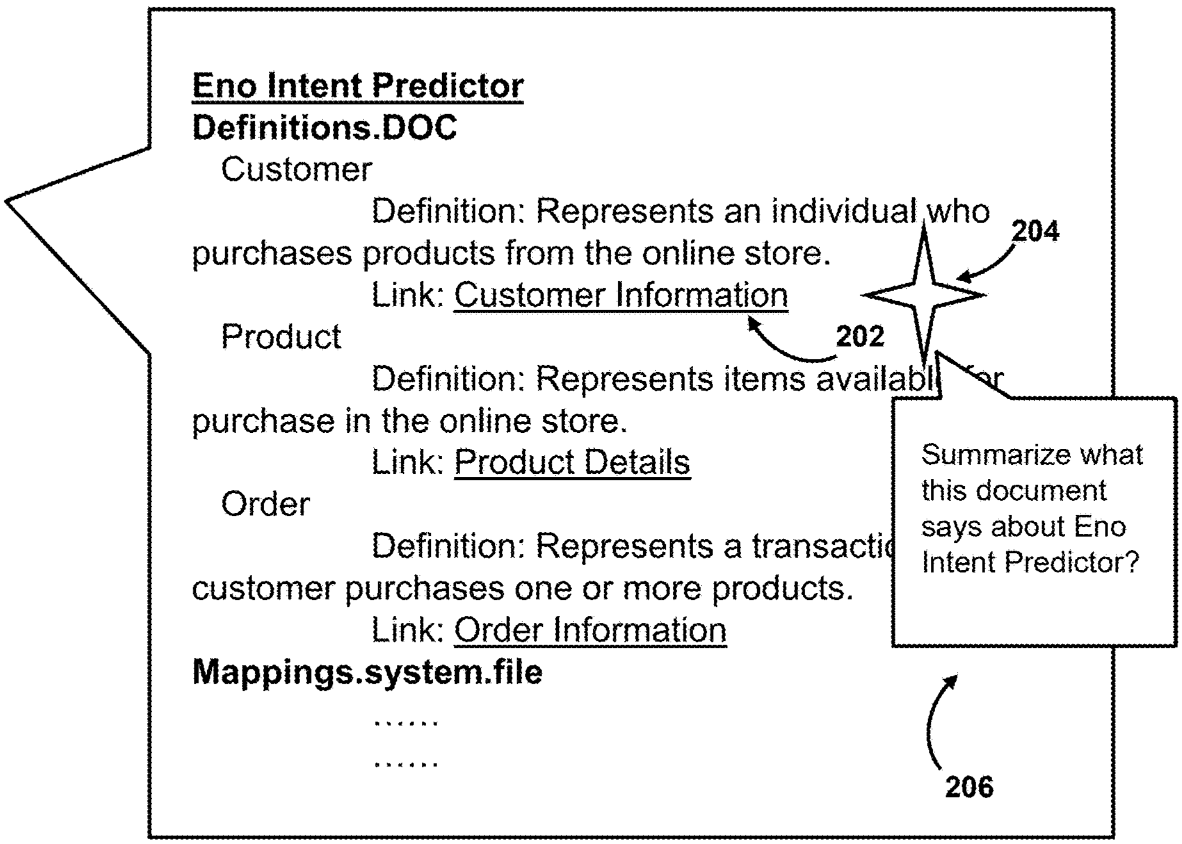
FIG. 2 shows an illustrative diagram for annotations related to link resolution, in accordance with one or more embodiments.

FIG. 2 shows an illustrative diagram for annotations related to link resolution, in accordance with one or more embodiments. For example, user interface 200 may represent content generate after the system identifies and links references to specific entities—models, programs, sub-organizations, and/or initiatives that are documented somewhere across the different internal applications within the computer networks—within a text string to their corresponding detailed entries or data records. For example, user interface 200 include link 202, which may link a given entity (e.g., "Eno Intent Predictor") to a definition for "Customer Information" residing in a document stored across the computer network.

For example, the system may perform entity recognition, where the system scans documents to detect and classify mentions of various entities based on predefined categories. This can be achieved through natural language processing (NLP) techniques, which analyze the text to understand context, syntax, and semantics. Common methods include named entity recognition (NER) algorithms that can identify entity names within the text and classify them into categories such as person, location, or organization.

Once entities are identified, the system must resolve these entities to specific, unique identifiers within a database or a knowledge base. This may involve the system comparing the extracted entity mentions to a repository of known entities. The system considers various attributes, such as contextual clues in the text surrounding the mention, other metadata like document date or author, and external knowledge sources to accurately link the text mention to the correct entity in the database.

After entities are disambiguated, the system creates links from the mentions in the document to the corresponding entity records. These links can be embedded within the digital text as hyperlinks, allowing users to click on an entity mention and be directed to a page or a record that provides more information about that entity. Alternatively, the links can be stored as metadata that associates parts of the text with database identifiers or URLs, which can be accessed programmatically or displayed as tooltips or side panels within the document viewer.

The ability to perform efficient link resolution enhances the document's utility by providing easy access to additional, detailed information, and facilitates better data integration and knowledge discovery. This capability is particularly valuable in fields like legal research, academic study, and any professional area where detailed, accurate information retrieval can significantly impact productivity and insights.

User interface 200 also includes icon 204. For example, icon 204 may comprise an option to allow a user to edit a link, entity, and/or any other annotation characteristic for related to link 202. In some embodiments, icon 204 may open an additional window or other form to allow a user to enter information related to link 202 and/or data related there to. For example, in response to selecting icon 204, the system may generate a query (e.g., query 206) to a user. For example, the system may to generate additional queries used to rank potentially link documents and/or receive user feedback.

In some embodiments, the queries may use a language model to prompt a user to enter information. For example, the queries may ask: "Does the following text describe [ENTITY] or only reference it? If it describes [ENTITY] please summarize the document. [INSERT DOC]." As another example, the query may ask "Can you summarize this document? [INSERT DOC]." The system may use the responses to rank and/or link entities and documents.

Figure 3:
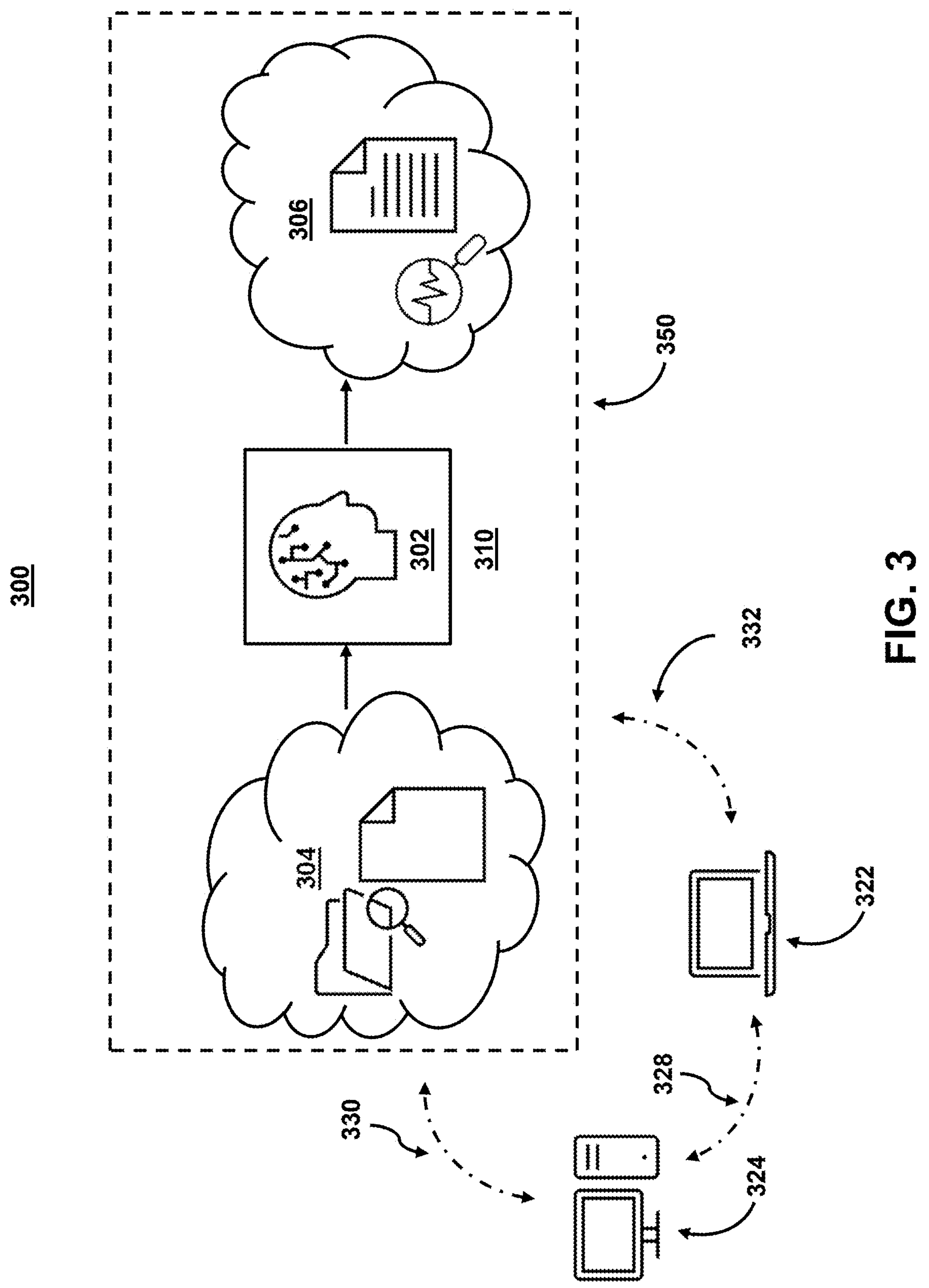
FIG. 3 shows illustrative components for a system using an artificial intelligence model architecture, in accordance with one or more embodiments.

FIG. 3 shows illustrative components for a system using an artificial intelligence model architecture, in accordance with one or more embodiments. For example, FIG. 3 may show illustrative components for a system using a novel artificial intelligence model architecture that involves a first artificial intelligence model trained to map a plurality of entities to ranked documentation from a documentation source and a second artificial intelligence model that comprises a language model trained to generate an additional query to run on the plurality of documents from the documentation source.

As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction.

Model 302 may include one or more additional models (e.g., a first and second artificial intelligence model that are each trained to generate different data and/or outputs based on a different training regime. For example, model 302 may include a first artificial intelligence model trained to map a plurality of entities to ranked documentation from a documentation source. For example, the system may collect a large dataset of entities and their associated documentation, which may be pre-processed to ensure consistency and quality. The entities may represent various models, programs, sub-organizations, and/or initiatives that are documented somewhere across different internal applications within the computer networks. This dataset is then used to train the model, typically employing techniques such as supervised learning, where the model learns from labeled examples indicating the correct mapping between entities and documents. During training, the model might utilize natural language processing (NLP) algorithms to understand the context and semantics of both the entities and the documents.

To enhance the model's ability to rank documentation, relevance scoring mechanisms are integrated, which assess the pertinence of each document concerning the entities. These mechanisms can include techniques like TF-IDF (Term Frequency-Inverse Document Frequency), word embeddings, or more sophisticated methods like transformer-based architectures (e.g., BERT or GPT). The model is iteratively trained and validated using a subset of the dataset to fine-tune its parameters and improve its accuracy in ranking.

Additionally, the system may incorporate feedback loops, where the performance of the model is continuously monitored and refined based on real-world interactions and user feedback. This ensures that the model adapts to evolving documentation and entity contexts. The final output is a system capable of efficiently mapping entities to the most relevant and ranked documentation, aiding in information retrieval and decision-making processes.

Model 302 may also include a second artificial intelligence model that comprises a language model trained to generate an additional query to run on the plurality of documents from the documentation source. For example, the model may comprise a language model designed to generate additional queries to run on a plurality of documents from a documentation source using a comprehensive dataset comprising queries, documents, and the relationships between them is curated. This dataset may serve as the foundation for training the language model. The system may begin with pre-processing the data to ensure it is clean and structured, which may involve tokenizing the text, removing irrelevant information, and standardizing formats. The language model, which may be based on advanced architectures such as transformers (e.g., GPT, BERT), may then be pre-trained on a large corpus of text data to learn the nuances of language, context, and semantics.

Once pre-training is completed, the model undergoes fine-tuning using the curated dataset of queries and documents. During this phase, the model learns to understand the context of a given query and generate relevant additional queries that could potentially retrieve more comprehensive information from the documentation source. Techniques such as supervised learning are employed, where the model is trained on examples of initial queries paired with effective additional queries that lead to better document retrieval outcomes. To enhance the model's ability to generate useful additional queries, reinforcement learning can be incorporated. This involves creating a feedback loop where the model's performance is evaluated based on the relevance and quality of the documents retrieved by the generated queries. Positive reinforcement is given when the additional queries improve the retrieval results, and adjustments are made to the model's parameters accordingly.

Throughout the training process, the system may leverage evaluation metrics to assess the model's effectiveness in generating additional queries that enhance document retrieval. Metrics such as precision, recall, and F1 score help in fine-tuning the model to balance generating queries that are both specific and broad enough to retrieve the most relevant documents. Ultimately, the trained language model is integrated into the AI system, enabling it to dynamically generate additional queries that improve the efficiency and accuracy of information retrieval from a diverse and extensive documentation source.

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., a link, a ranking, a query, etc.).

In some embodiments, the model (e.g., model 302) may automatically perform actions based on outputs 306. In some embodiments, the model (e.g., model 302) may not perform any actions. The output of the model (e.g., model 302) may be used to determine a link, a ranking, a query, etc.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

Figure 4:
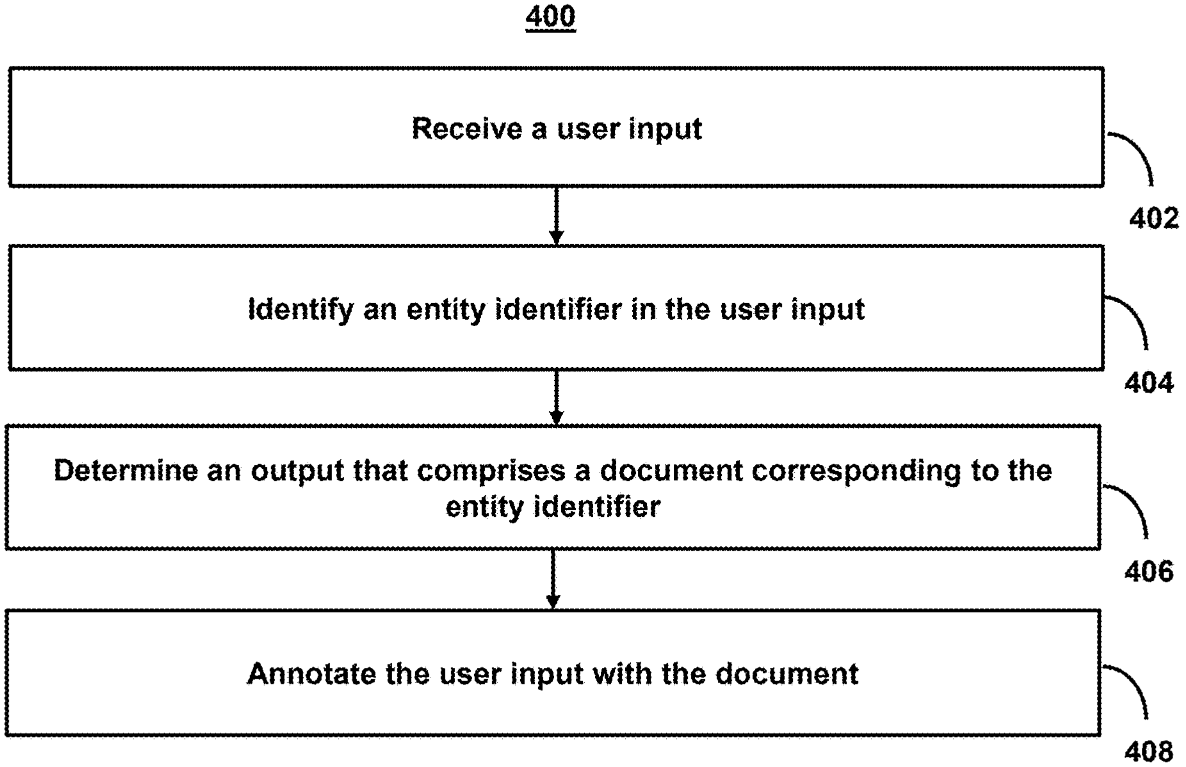
FIG. 4 shows a flowchart of the steps involved in link resolution for internal entities and documentation, in accordance with one or more embodiments.

FIG. 4 shows a flowchart of the steps involved in link resolution for internal entities and documentation, in accordance with one or more embodiments. For example, the system may use process 400 (e.g., as implemented on one or more system components described above) in order to provide link resolution for internal entities and documentation using pre-seeded language models.

At step 402, process 400 (e.g., using one or more components described above) receive a user input. For example, the system may receive, at a user interface, a first user input, wherein the first user input comprises entry of a first text string into a document writing software application. The system may parse the first text string. The system may use user interface of the document writing software is designed to accept text input from a user through devices like a keyboard, touchscreen, or speech-to-text feature. When the user starts typing or speaking, the input method editor (IME) or speech recognition module captures the keystrokes or spoken words.

The captured input is then processed by the software's event handling system, which identifies the specific actions performed by the user, such as entering text into a particular field or document section. This system translates the physical interactions into digital signals that the software can interpret. The document writing application's text editor component receives these signals and converts them into a readable text string, displaying it in real-time within the designated text area of the user interface.

Simultaneously, the software's underlying framework, which includes the text processing engine, ensures that the input is correctly formatted, rendered, and integrated into the document. This involves handling aspects like font styles, sizes, text alignment, and any other formatting options chosen by the user. Additionally, real-time spell-check and grammar-check features might analyze the text string for errors and suggest corrections.

At step 404, process 400 (e.g., using one or more components described above) identifies an entity identifier in the user input. For example, the system may then identify a first entity identifier of a plurality of entity identifiers in the first text string, wherein the first entity identifier corresponds to a first entity of a plurality of entities registered for the document writing software application. For example, when a user inputs the text string, the system captures this input in real-time. It then processes the text using natural language processing (NLP) techniques, which involve tokenizing the text into individual words or phrases and analyzing the structure and semantics to comprehend its content. An entity recognition model, typically based on machine learning methods such as Named Entity Recognition (NER), scans the tokenized text to detect and classify entities. This model is trained on a dataset encompassing various entity types and identifiers pertinent to the document writing software's domain. The system maintains a comprehensive database of registered entities and their corresponding identifiers, essential for mapping recognized entities in the text to those registered in the system. A matching algorithm may be used to compare the identified entities from the text string against this database, checking for exact matches, synonyms, or context-based matches, often utilizing fuzzy matching techniques to accommodate variations in the text. Upon identifying a potential entity in the text string, the system extracts the corresponding entity identifier from the database. If multiple entities are recognized, the system ranks them based on relevance or confidence scores assigned by the entity recognition model.

Additionally, the system may perform contextual validation to ensure the identified entity identifier is relevant to the document or user context, thus minimizing false positives and enhancing accuracy. The final identified entity identifier is then integrated into the document writing software's functions, such as tagging the text, linking to related documents or resources, or providing contextual information and suggestions to the user.

In some embodiments, the first artificial intelligence model may be trained to generate the ranked mapping of the plurality of entities to the plurality of documents by retrieving the plurality of entity identifiers, retrieving the plurality of documents from a documentation source, iteratively parsing one of the plurality of documents for one of the plurality of entity identifiers, and in response to detecting the one of the plurality of entity identifiers in the one of the plurality of documents, generating second feature inputs for the second artificial intelligence model to generate second outputs. For example, the system may retrieve a dataset that includes a plurality of entity identifiers and a plurality of documents from a documentation source. The system may iteratively parse each document in the dataset for occurrences of the entity identifiers. The system scans through one document at a time, employing natural language processing (NLP) techniques to identify and extract entity identifiers present within the text. When the system detects an entity identifier in a document, it recognizes this as a relevant match.

In response to detecting an entity identifier within a document, the system generates second feature inputs for the second AI model. These second feature inputs include detailed information about the detected entity identifier and its context within the document, such as its position, surrounding text, and any associated metadata. The second model, which is trained to generate additional queries, processes these feature inputs to create second outputs. These outputs are additional queries designed to refine and enhance the document retrieval process. The second outputs are then used to further probe the documentation source, retrieving more precise and contextually relevant information about the documents. This iterative querying and retrieval process enriches the data available for training the first model.

The first model utilizes the enriched dataset, now containing detailed mappings of entities to documents with refined contextual information, to learn the relationships between entities and documents. It employs machine learning algorithms to understand the patterns and associations, adjusting its parameters to improve the accuracy of its rankings. The model is trained to prioritize documents based on various ranking criteria, such as relevance, content quality, and contextual alignment.

Throughout the training process, the model's performance is continuously evaluated using metrics like precision, recall, and F1 score. These evaluations guide further fine-tuning and adjustments to the model's parameters. By iteratively parsing documents, generating feature inputs, and refining the retrieval process with the second AI model, the system effectively trains the first AI model to generate accurate and contextually relevant ranked mappings of entities to documents. This comprehensive training approach ensures that the AI model can provide users with the most pertinent and high-quality information based on their queries.

At step 406, process 400 (e.g., using one or more components described above) determines an output that comprises a document corresponding to the entity identifier. For example, the system may, in response to identifying the first entity identifier, generate a first feature input for a first artificial intelligence model, wherein the first artificial intelligence model is trained to generate a ranked mapping of the plurality of entities to a plurality of documents using a second artificial intelligence model that is trained to generate additional queries to run on the plurality of documents to determine rankings for the plurality of documents.

For example, upon identifying the first entity identifier within a text string, the system proceeds to generate a first feature input for a first artificial intelligence model. This model may be designed to create a ranked mapping of a plurality of entities to a plurality of documents. The process begins with the system extracting relevant features from the context in which the first entity identifier was found. These features may include the surrounding text, the position of the entity within the text, and any metadata associated with the document, such as author, date, or document type.

Once these features are extracted, they are formatted into a structured input suitable for the first model. This input encapsulates the necessary information to represent the identified entity and its context accurately. The first model, which has been trained on a large dataset of entities and documents, uses this feature input to generate a ranked mapping. This model relies on its understanding of the relationships between entities and documents, as learned during its training phase.

In parallel, the system leverages a second model specifically trained to generate additional queries to enhance the document ranking process. This second model analyzes the initial feature input and generates supplementary queries that target the plurality of documents more precisely. These additional queries are designed to refine the search results, ensuring that the most relevant documents are identified.

The responses from these additional queries are then fed back into the first model. The model uses this enriched information to update and refine its ranked mapping of entities to documents. This iterative process, involving the interplay between the first and second models, enables the system to produce highly accurate and contextually relevant rankings. The final output is a prioritized list of documents, each ranked according to its relevance to the identified entity and the enriched context provided by the additional queries. This approach ensures that users receive the most pertinent information efficiently, leveraging the combined strengths of both models.

The system may then input the first feature input into the first artificial intelligence model to receive a first output, wherein the first output comprises a first document identifier for a first document from the plurality of documents corresponding to the first entity identifier that is determined to have a first rank based on one or more ranking criteria. For example, once the system generates the first feature input in response to identifying the first entity identifier, it proceeds to input this feature set into the first artificial intelligence model. This model, trained to map entities to relevant documents, requires structured data to process the input effectively. The feature input, which encapsulates information about the identified entity and its context, is fed into the model through its designated input interface. The model, utilizing its pre-trained algorithms, processes the feature input to analyze the entity's relevance across the plurality of documents. It leverages its understanding of the relationships between entities and documents, which it has learned from extensive training data. The model evaluates the input against its internal knowledge base, employing various ranking criteria such as document relevance, content quality, contextual matching, and historical user interaction data.

In some embodiments, the system may generate a first feature input for the first artificial intelligence model that comprises determining the first entity corresponding to the first entity identifier and retrieving a subset of the plurality of entity identifiers for the first entity. For example, the system leverages a database or knowledge graph that stores detailed information about entities and their relationships. By querying this database, the system extracts related entity identifiers that are pertinent to the first entity. These related identifiers might include synonyms, aliases, or contextually linked terms that enhance the representation of the first entity.

After compiling this subset of entity identifiers, the system integrates them into the feature input for the first AI model. This feature input comprises not only the initial entity identifier but also the additional identifiers that provide a broader context. This enriched input allows the model to more accurately map the entity to relevant documents, considering a wider range of related terms and contexts. The feature input is structured to include various attributes such as the primary entity identifier, related entity identifiers, and any relevant metadata or contextual information. This comprehensive feature set is then fed into the first model, enabling it to generate a ranked mapping of the plurality of entities to the plurality of documents.

Upon processing the input, the model generates a first output, which includes a ranked list of document identifiers. The first output specifically highlights a first document identifier corresponding to the first document from the plurality of documents that is most relevant to the first entity identifier. This document is determined to have the highest rank based on the predefined ranking criteria. These criteria might include the frequency of the entity within the document, the prominence of the document in previous searches, and the contextual match between the entity and the document content.

In some embodiments, generating the ranked mapping of the plurality of entities to the plurality of documents comprises the system determining a subset of the plurality of documents that corresponds to the first entity and ranking each document in the plurality of documents. For example, the system may analyze the content of each document to identify mentions of the first entity and evaluates the context in which the entity appears. This analysis includes examining the frequency of the entity's occurrence, its placement within the document, and the surrounding text to gauge the relevance and significance of each mention. The system also considers metadata associated with the documents, such as author information, publication date, and document type, to further refine the relevance assessment. Once the documents mentioning the first entity are identified, the system compiles this subset of documents for further evaluation. Each document in this subset is then subjected to a ranking process based on predefined ranking criteria. These criteria might include factors such as the relevance of the entity mentions, the quality and credibility of the document, user interaction history, and other contextual elements.

In some embodiments, a first document identifier is determined to have the first rank based on the one or more ranking criteria by generating a first query, using the second artificial intelligence model, for a summary of the first document, determining a characteristic of the summary, and determining the first rank based on the characteristic. For example, the second model generates a first query specifically designed to obtain a summary of the first document. This query is crafted to extract concise and relevant information that encapsulates the essence of the document, ensuring that the summary is representative of the document's content and context. The system then processes this query to retrieve the summary of the first document from the documentation source. Upon retrieving the summary, the system analyzes its characteristics. This analysis involves examining various aspects such as the clarity, coherence, relevance, and completeness of the summary. The system evaluates how well the summary represents the key points and the context of the first document, as well as how effectively it aligns with the predefined ranking criteria. These criteria might include the relevance of the content to the first entity, the quality of the information presented, and the presence of any critical insights or valuable data.

Based on the analysis of the summary's characteristics, the system determines a relevance score for the first document. This score reflects how well the document meets the ranking criteria, considering the summarized content's quality and relevance. The relevance score is then used to assign a rank to the first document. The first document identifier is given a first rank if it achieves the highest relevance score compared to other documents in the subset. By leveraging the second model to generate targeted queries for document summaries and analyzing the characteristics of these summaries, the system can accurately assess and rank documents.

In some embodiments, a first document identifier is determined to have the first rank based on the one or more ranking criteria by generating a first query, using the second artificial intelligence model, to perform a comparison of the first document and a second document, determining a characteristic of the comparison, and determining the first rank based on the characteristic. Upon executing the query, the system retrieves the comparison results, which include a comprehensive assessment of both documents'content. The system examines various characteristics of this comparison, such as the depth of information, clarity, relevance to the first entity, and any unique insights provided by each document. It assesses how each document addresses the entity in question, considering factors like completeness, accuracy, and the presence of critical details.

Based on the characteristics of the comparison, the system determines the relevance scores for both documents. It evaluates which document provides a more comprehensive and pertinent coverage of the entity, aligning with the predefined ranking criteria. The first document identifier is assigned a first rank if the first document demonstrates superior characteristics in the comparison, such as higher relevance, better quality of information, and stronger contextual alignment with the entity. By leveraging the second model to generate and execute comparison queries, the system can perform a detailed analysis of the documents'relative merits. This process ensures that the ranking is based on a thorough and nuanced understanding of the documents'content and how well they meet the ranking criteria.

In some embodiments, a first document identifier is determined to have the first rank based on the one or more ranking criteria by generating a first query, using the second artificial intelligence model, for a first word count of a first word in the first document, determining the first word count based on the first query and determining the first rank based on the first word count. The system employs the second artificial intelligence model, which is trained to generate targeted queries, to create a first query aimed at determining the word count of a specific word or phrase in the first document. This word, often a key term or entity identifier, is crucial for assessing the document's relevance. The query generated by the second AI model specifically requests the count of occurrences of this word within the first document. Upon executing the query, the system retrieves the word count result, which indicates the frequency of the first word in the first document. This word count is a significant characteristic used to evaluate the document's relevance and alignment with the ranking criteria. A higher word count of the key term typically suggests that the document is more focused on the subject related to the first entity.

The system then determines the first document's rank based on this word count. It compares the word count against predefined thresholds or in relation to the word counts in other documents within the subset. If the first document exhibits a higher word count of the key term compared to others, it is considered to have a higher relevance and is thus assigned a higher rank. By generating and executing this targeted query, the system effectively utilizes the second model to perform a quantitative analysis of the document's content. The word count serves as a straightforward yet powerful metric to gauge the document's focus and relevance regarding the first entity. Consequently, the system can accurately assign the first rank to the document that best meets the ranking criteria based on the frequency of the key term, ensuring that users receive the most pertinent information.

In some embodiments, a first document identifier is determined to have the first rank based on the one or more ranking criteria by generating a first query, using the second artificial intelligence model, for performing a Boolean operation on text of the first document, performing the Boolean operation, and determining the first rank based on a result of the Boolean operation. For example, the system utilizes the second artificial intelligence model, which is trained to generate advanced queries, to create a first query designed to perform a Boolean operation on the text of the first document. This query specifies a Boolean expression involving keywords, phrases, or conditions relevant to the ranking criteria. Boolean operations may include logical AND, OR, and NOT operations to refine the search and analysis of the document's content. Upon generating the query, the system executes it to perform the Boolean operation on the text of the first document. For example, the query might seek to identify instances where specific key terms appear together (AND operation), where at least one of several terms is present (OR operation), or where certain terms are excluded (NOT operation). The result of this Boolean operation provides a detailed insight into the document's content and its relevance to the entity.

The system then analyzes the result of the Boolean operation to determine the document's relevance based on the ranking criteria. The presence, absence, or combination of key terms as specified in the Boolean query helps assess how well the document aligns with the criteria. If the result of the Boolean operation indicates a strong match with the criteria—such as multiple relevant terms appearing together or the exclusion of irrelevant content—the document is deemed highly relevant. Based on this analysis, the system assigns a relevance score to the first document and determines its rank accordingly. The document with the highest relevance score, as indicated by the result of the Boolean operation, is given the first rank. This process ensures that the ranking is based on a logical and systematic evaluation of the document's content, aligning closely with the specified criteria. By leveraging the second model to generate and execute Boolean queries, the system can perform precise and meaningful content analysis. The Boolean operation's results provide a clear metric for determining the document's relevance, enabling the system to accurately rank the documents and ensure users receive the most relevant and high-quality information.

At step 408, process 400 (e.g., using one or more components described above) annotates the user input with the document. For example, the system may generate for display, in the user interface, the first text string with a first annotation comprising the first document identifier for the first document and the first rank. The system may receive this first output from the model and interprets the first document identifier as the most pertinent document for the given entity. This output is then used to present the user with the top-ranked document, ensuring that the most relevant information is easily accessible. By efficiently inputting the feature set into the model and interpreting the resulting output, the system provides a streamlined and effective means of retrieving and ranking documents based on entity relevance.

In some embodiments, the system may receive a ranking criterion and generate a second feature input for the second artificial intelligence model to generate a second output, wherein the second artificial intelligence model comprises a language model trained to generate an additional query to be run on the one of the plurality of documents, and wherein the additional query is generated based on the ranking criterion and the first entity identifier. For example, the ranking criterion, which could include factors such as relevance, document quality, or contextual importance, is first parsed and understood by the system. This ranking criterion serves as a guide for refining the document retrieval process to ensure that the most relevant and high-quality documents are prioritized. The system then uses the first entity identifier, previously identified in the document, and the received ranking criterion to construct a second feature input. This feature input includes the entity identifier, the context in which it was found, and specific parameters derived from the ranking criterion. For example, if the ranking criterion emphasizes document relevance, the feature input will highlight contextual information that aligns with the relevance of the entity within the document.

The second model, which is a language model, processes this second feature input. Leveraging its training on vast amounts of text data and its ability to understand complex language patterns, the model generates an additional query. This additional query is designed to be run on the document or the documentation source to refine and enhance the search results based on the given ranking criterion and the first entity identifier. The language model tailors the query to extract more precise and contextually relevant information that meets the specified ranking criteria.

The generated additional query, or second output, is then used to re-query the documentation source. This step aims to retrieve documents or sections of documents that better match the ranking criteria and the context of the entity identifier. By doing so, the system ensures that the retrieved information is not only relevant to the entity but also adheres to the prioritization set by the ranking criterion.

In some embodiments, generating for display, in the user interface, the first text string with the first annotation comprises modifying a visual characteristic of the first text string and generating for display, the first document identifier. For example, the system identifies the first text string that contains the first entity identifier. To annotate this text string, the system modifies its visual characteristics to distinguish it from the rest of the text. This modification can include changes such as highlighting the text, altering its color, underlining, or changing the font style or size. These visual changes make the annotated text easily noticeable to the user. Once the visual characteristics of the first text string are modified, the system prepares the annotated text for display in the user interface. This involves integrating the modified text string into the document or the relevant section of the interface, ensuring that the annotation stands out and is contextually appropriate. The annotated text provides the user with a clear indication that the text string has been identified and highlighted due to its relevance to the first entity identifier. Simultaneously, the system generates for display the first document identifier. This identifier, which has been determined to have the highest rank based on the one or more ranking criteria, is prepared to be shown in the user interface. The document identifier could be presented in various forms, such as a clickable link, a tooltip, a sidebar entry, or a section within a summary or list. The system ensures that this identifier is prominently displayed alongside or near the annotated text string, providing an intuitive and seamless user experience. The final display in the user interface consists of the first text string with its visual modifications, clearly annotated to draw the user's attention, and the first document identifier, readily accessible for the user to interact with.

In some embodiments, generating for display, in the user interface, the first text string with the first annotation by receiving a second user input, wherein the second user input comprises a score for the first rank and modifying the first rank based on the score. For example, this score is provided by the user and reflects their assessment of the relevance or accuracy of the first rank assigned to the document identifier associated with the first text string. Upon receiving this score, the system evaluates its impact on the initially determined first rank. The system incorporates the user-provided score into its ranking algorithm, adjusting the first rank accordingly. This adjustment might involve recalculating the relevance score of the document by combining the user's input with existing ranking criteria, such as content relevance, document quality, and contextual alignment. The recalibration ensures that the system accounts for user feedback, which may highlight new insights or preferences not initially considered by the algorithm.

Following the modification of the first rank based on the user-provided score, the system updates the user interface to reflect these changes. The first text string, now annotated to indicate its importance or relevance based on the revised rank, is visually modified. This annotation could include highlighting, color changes, underlining, or altering the font style or size to make the text string stand out to the user. Additionally, the updated first document identifier, reflecting its new rank, is prepared for display. This identifier is presented in the user interface in a prominent and accessible manner, such as a clickable link, a tooltip, or an entry in a sidebar. The display ensures that the user can easily identify the most relevant document based on both the system's algorithm and their feedback. By integrating the second user input into the ranking process and updating the display accordingly, the system not only enhances the accuracy and relevance of the information provided but also fosters a more interactive and responsive user experience.

In some embodiments, the system may determine a modification to the ranked mapping based on the first output and update the ranked mapping based on the modification. This may include retrieving a list of database links between the plurality of entities and the plurality of documents. The system may then determine a new link based on the first output and update the ranked mapping to include the new link. For example, the system may retrieve a list of database links that represent the existing relationships between the plurality of entities and the plurality of documents. These links serve as the foundation for the current ranked mapping, which outlines how entities are associated with documents based on predefined ranking criteria.

When the system receives the first output, which might include new insights, relevance scores, or user feedback, it analyzes this data to identify any necessary modifications to the existing ranked mapping. The first output provides valuable information that may highlight previously unrecognized relationships or suggest adjustments to the importance of certain links. Using the first output, the system determines whether a new link between an entity and a document should be established. This involves assessing the relevance and quality of the document in relation to the entity based on the new data. For instance, if the first output indicates a high relevance score for a particular document concerning an entity, the system may decide to create a new link or modify an existing link to reflect this updated assessment.

The system then proceeds to update the ranked mapping to include the new link. This involves recalculating the rankings to account for the new or modified relationships. The recalibration process integrates the new link into the overall mapping, adjusting the positions of entities and documents within the ranked list based on the updated relevance scores and other ranking criteria. The system ensures that the updated mapping accurately reflects the most current and pertinent relationships between entities and documents.

Finally, the system saves the updated ranked mapping back to the database, ensuring that the new link and the revised rankings are stored and accessible for future reference. This updated mapping is then utilized to provide users with the most relevant and high-quality information, improving the overall accuracy and utility of the document retrieval system. By continuously integrating new data and user feedback, the system maintains a dynamic and responsive ranked mapping that evolves to meet the users'needs effectively.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for link resolution for internal entities and documentation using pre-seeded language models.
2. The method of the preceding embodiment, further comprising: receiving, at a user interface, a first user input, wherein the first user input comprises entry of a first text string into a document writing software application; parsing the first text string; identify a first entity identifier of a plurality of entity identifiers in the first text string, wherein the first entity identifier corresponds to a first entity of a plurality of entities registered for the document writing software application; in response to identifying the first entity identifier, generating a first feature input for a first artificial intelligence model, wherein the first artificial intelligence model is trained to generate a ranked mapping of the plurality of entities to a plurality of documents using a second artificial intelligence model that is trained to generate additional queries to run on the plurality of documents to determine rankings for the plurality of documents; inputting the first feature input into the first artificial intelligence model to receive a first output, wherein the first output comprises a first document identifier for a first document from the plurality of documents corresponding to the first entity identifier that is determined to have a first rank based on one or more ranking criteria; and generating for display, in the user interface, the first text string with a first annotation comprising the first document identifier for the first document and the first rank.
3. The method of any one of the preceding embodiments, wherein the first artificial intelligence model is trained to generate the ranked mapping of the plurality of entities to the plurality of documents by: retrieving the plurality of entity identifiers; retrieving the plurality of documents from a documentation source;

iteratively parsing one of the plurality of documents for one of the plurality of entity identifiers; and in response to detecting the one of the plurality of entity identifiers in the one of the plurality of documents, generating second feature inputs for the second artificial intelligence model to generate second outputs.

4. The method of any one of the preceding embodiments, further comprising: receiving a ranking criterion; and generating a second feature input for the second artificial intelligence model to generate a second output, wherein the second artificial intelligence model comprises a language model trained to generate an additional query to be run on the one of the plurality of documents, and wherein the additional query is generated based on the ranking criterion and the first entity identifier.
5. The method of any one of the preceding embodiments, wherein generating the first feature input for the first artificial intelligence model comprises: determining the first entity corresponding to the first entity identifier; and retrieving a subset of the plurality of entity identifiers for the first entity.
6. The method of any one of the preceding embodiments, wherein generating the ranked mapping of the plurality of entities to the plurality of documents further comprises: determining a subset of the plurality of documents that corresponds to the first entity; and ranking each document in the plurality of documents.
7. The method of any one of the preceding embodiments, wherein the first document identifier is determined to have the first rank based on the one or more ranking criteria by: generating a first query, using the second artificial intelligence model, for a summary of the first document; determining a characteristic of the summary; and determining the first rank based on the characteristic.
8. The method of any one of the preceding embodiments, wherein the first document identifier is determined to have the first rank based on the one or more ranking criteria by: generating a first query, using the second artificial intelligence model, to perform a comparison of the first document and a second document; determining a characteristic of the comparison; and determining the first rank based on the characteristic.
9. The method of any one of the preceding embodiments, wherein the first document identifier is determined to have the first rank based on the one or more ranking criteria by: generating a first query, using the second artificial intelligence model, for a first word count of a first word in the first document; determining the first word count based on the first query; and determining the first rank based on the first word count.
10. The method of any one of the preceding embodiments, wherein the first document identifier is determined to have the first rank based on the one or more ranking criteria by: generating a first query, using the second artificial intelligence model, for performing a Boolean operation on text of the first document; performing the Boolean operation; and determining the first rank based on a result of the Boolean operation.
11. The method of any one of the preceding embodiments, wherein generating for display, in the user interface, the first text string with the first annotation comprises: modifying a visual characteristic of the first text string; and generating for display, the first document identifier.
12. The method of any one of the preceding embodiments, wherein generating for display, in the user interface, the first text string with the first annotation comprises: receiving a second user input, wherein the second user input comprises a score for the first rank; and modifying the first rank based on the score.
13. The method of any one of the preceding embodiments, further comprising: determining a modification to the ranked mapping based on the first output; and updating the ranked mapping based on the modification.
14. The method of any one of the preceding embodiments, wherein the ranked mapping comprises a list of database links between the plurality of entities and the plurality of documents.
15. The method of any one of the preceding embodiments, further comprising: determining a new link based on the first output; and updating the ranked mapping to include the new link.
16. One or more non-transitory, computer-readable mediums storing instructions that, when executed by a data processing apparatus, cause the data processing apparatus to perform operations comprising those of any of embodiments 1-15.
17. A system comprising one or more processors; and memory storing instructions that, when executed by the processors, cause the processors to effectuate operations comprising those of any of embodiments 1-15.
18. A system comprising means for performing any of embodiments 1-15.

What is claimed is:

1. A system for link resolution for internal entities and documentation using pre-seeded language models, the system comprising:

one or more processors; and one or more computer-readable mediums comprising instructions recorded thereon that when executed by the one or more processors cause operations comprising:

receiving, at a user interface, a first user input, wherein the first user input comprises entry of a first text string into a document writing software application;

parsing the first text string based on a type of the document writing software application;

identify a first entity identifier of a plurality of entity identifiers, wherein the first entity identifier corresponds to a first entity of a plurality of entities registered for the document writing software application;

in response to identifying the first entity identifier, generating a first feature input for a first artificial intelligence model, wherein the first artificial intelligence model is trained to map the plurality of entities to ranked documentation from a documentation source using pre-seeded training data by:

retrieving the plurality of entity identifiers;

retrieving a plurality of documents from the documentation source;

iteratively parsing one of the plurality of documents for one of the plurality of entity identifiers;

in response to detecting the one of the plurality of entity identifiers in the one of the plurality of documents, generating second feature inputs for a second artificial intelligence model to generate second outputs, wherein the second artificial intelligence model comprises a language model trained to generate an additional query to run on the one of the plurality of documents, and wherein the additional query is generated based on one or more ranking criteria and the one of the plurality of entity identifiers;

inputting the first feature input into the first artificial intelligence model to receive a first output, wherein the first output comprises a first document identifier for a first document from the plurality of documents corresponding to the first entity identifier that is determined to have a first rank based on one or more ranking criteria; and generating for display, in the user interface, the first text string with a first annotation comprising the first document identifier for the first document and the first rank, wherein the pre-seeded training data is updated by the first annotation.

2. A method for link resolution for internal entities and documentation using pre-seeded language models, the method comprising:

receiving, at a user interface, a first user input, wherein the first user input comprises entry of a first text string into a document writing software application;

parsing the first text string;

identify a first entity identifier of a plurality of entity identifiers in the first text string, wherein the first entity identifier corresponds to a first entity of a plurality of entities registered for the document writing software application;

in response to identifying the first entity identifier, generating a first feature input for a first artificial intelligence model, wherein the first artificial intelligence model is trained to generate a ranked mapping of the plurality of entities to a plurality of documents using a second artificial intelligence model that is trained to generate additional queries to run on the plurality of documents to determine rankings for the plurality of documents;

inputting the first feature input into the first artificial intelligence model to receive a first output, wherein the first output comprises a first document identifier for a first document from the plurality of documents corresponding to the first entity identifier that is determined to have a first rank based on one or more ranking criteria; and generating for display, in the user interface, the first text string with a first annotation comprising the first document identifier for the first document and the first rank.

3. The method of claim 2, wherein the first artificial intelligence model is trained to generate the ranked mapping of the plurality of entities to the plurality of documents by:

retrieving the plurality of entity identifiers;

retrieving the plurality of documents from a documentation source;

iteratively parsing one of the plurality of documents for one of the plurality of entity identifiers; and in response to detecting the one of the plurality of entity identifiers in the one of the plurality of documents, generating second feature inputs for the second artificial intelligence model to generate second outputs.

4. The method of claim 2, further comprising:

receiving a ranking criterion; and generating a second feature input for the second artificial intelligence model to generate a second output, wherein the second artificial intelligence model comprises a language model trained to generate an additional query to be run on one of the plurality of documents, and wherein the additional query is generated based on the ranking criterion and the first entity identifier.

5. The method of claim 2, wherein generating the first feature input for the first artificial intelligence model comprises:

determining the first entity corresponding to the first entity identifier; and retrieving a subset of the plurality of entity identifiers for the first entity.

6. The method of claim 2, wherein generating the ranked mapping of the plurality of entities to the plurality of documents further comprises:

determining a subset of the plurality of documents that corresponds to the first entity; and ranking each document in the plurality of documents.

7. The method of claim 2, wherein the first document identifier is determined to have the first rank based on the one or more ranking criteria by:

generating a first query, using the second artificial intelligence model, for a summary of the first document;

determining a characteristic of the summary; and determining the first rank based on the characteristic.

8. The method of claim 2, wherein the first document identifier is determined to have the first rank based on the one or more ranking criteria by:

generating a first query, using the second artificial intelligence model, to perform a comparison of the first document and a second document;

determining a characteristic of the comparison; and determining the first rank based on the characteristic.

9. The method of claim 2, wherein the first document identifier is determined to have the first rank based on the one or more ranking criteria by:

generating a first query, using the second artificial intelligence model, for a first word count of a first word in the first document;

determining the first word count based on the first query; and determining the first rank based on the first word count.

10. The method of claim 2, wherein the first document identifier is determined to have the first rank based on the one or more ranking criteria by:

generating a first query, using the second artificial intelligence model, for performing a Boolean operation on text of the first document;

performing the Boolean operation; and determining the first rank based on a result of the Boolean operation.

11. The method of claim 2, wherein generating for display, in the user interface, the first text string with the first annotation comprises:

modifying a visual characteristic of the first text string; and generating for display, the first document identifier.

12. The method of claim 2, wherein generating for display, in the user interface, the first text string with the first annotation comprises:

receiving a second user input, wherein the second user input comprises a score for the first rank; and modifying the first rank based on the score.

13. The method of claim 2, further comprising:

determining a modification to the ranked mapping based on the first output; and updating the ranked mapping based on the modification.

14. The method of claim 2, wherein the ranked mapping comprises a list of database links between the plurality of entities and the plurality of documents.

15. The method of claim 14, further comprising:

determining a new link based on the first output; and updating the ranked mapping to include the new link.

16. One or more non-transitory, computer-readable mediums, comprising instructions that, when executed by one or more processors, cause operations comprising:

identify, in a first text string, a first entity identifier of a plurality of entity identifiers, wherein the first entity identifier corresponds to a first entity of a plurality of entities;

in response to identifying the first entity identifier, generating a first feature input for a first artificial intelligence model, wherein the first artificial intelligence model is trained to generate a ranked mapping of the plurality of entities to a plurality of documents using a second artificial intelligence model that is trained to generate additional queries to run on the plurality of documents to determine rankings for the plurality of documents;

inputting the first feature input into the first artificial intelligence model to receive a first output, wherein the first output comprises a first document identifier for a first document from the plurality of documents corresponding to the first entity identifier that is determined to have a first rank based on one or more ranking criteria; and generating for display, in a user interface, the first text string with a first annotation comprising the first document identifier for the first document and the first rank.

17. The one or more non-transitory, computer-readable mediums of claim 16, wherein the first artificial intelligence model is trained to generate the ranked mapping of the plurality of entities to the plurality of documents by:

retrieving the plurality of entity identifiers;

retrieving the plurality of documents from a documentation source;

iteratively parsing one of the plurality of documents for one of the plurality of entity identifiers; and in response to detecting the one of the plurality of entity identifiers in the one of the plurality of documents, generating second feature inputs for the second artificial intelligence model to generate second outputs.

18. The one or more non-transitory, computer-readable mediums of claim 16, further comprising:

receiving a ranking criterion; and generating a second feature input for the second artificial intelligence model to generate a second output, wherein the second artificial intelligence model comprises a language model trained to generate an additional query to be run on the one of the plurality of documents, and wherein the additional query is generated based on the ranking criterion and the first entity identifier.

19. The one or more non-transitory, computer-readable mediums of claim 16, wherein generating the first feature input for the first artificial intelligence model comprises:

determining the first entity corresponding to the first entity identifier; and retrieving a subset of the plurality of entity identifiers for the first entity.

20. The one or more non-transitory, computer-readable mediums of claim 16, wherein generating the ranked mapping of the plurality of entities to the plurality of documents further comprises:

determining a subset of the plurality of documents that corresponds to the first entity; and ranking each document in the plurality of documents.

* * * * *